US008456674B2

(12) United States Patent
Li et al.

(10) Patent No.: US 8,456,674 B2
(45) Date of Patent: Jun. 4, 2013

(54) PRINTING PROCESS MODEL PREDICTIVE CONTROL WITH DISTURBANCE PREVIEW

(75) Inventors: Faming Li, Penfield, NY (US); Eric Scott Hamby, Webster, NY (US); Yongsoon Eun, Webster, NY (US)

(73) Assignee: Xerox Corporation, Norwalk ( * ) Notice: Subject to any disclaimer, the term of this patent is extended or adjusted under 35 U.S.C. 154(b) by 888 days.

(21) Appl. No.: 12/603,674

(22) Filed: Oct. 22, 2009

(65) Prior Publication Data

US 2011/0096353 A1 Apr. 28, 2011

(51) Int. Cl.
*G06F 3/12* (2006.01)

(52) U.S. Cl.
USPC ....... 358/1.15; 358/1.12; 358/1.13; 358/1.14; 399/320; 399/388; 399/389; 399/395; 399/400; 347/112; 347/153; 347/154; 347/155; 347/156

(58) Field of Classification Search
USPC ................ 347/5, 14, 15, 16, 17, 19, 32, 101, 347/103, 112, 153, 154, 155, 156; 399/16, 399/17, 18, 19, 20, 21, 23, 24, 33, 66, 67, 320, 322, 388, 389, 395, 400; 358/1.12, 1.13, 358/1.14, 1.15
See application file for complete search history.

*Primary Examiner* — Vu B Hang
(74) *Attorney, Agent, or Firm* — Ronald E. Prass, Jr.; Prass LLP

(57) ABSTRACT

According to aspects of the embodiments, there is provided methods and systems that incorporate a model predictive controller (MPC) in an image reproduction machine with known disturbance information. The MPC uses the control action at a current time in order to minimize the impact of an impending disturbance as well as to maximize current control performance. The impending disturbance is used by the MPC to determine an incremental change that combines steady state and transient state impact on the image reproduction machine. Disturbance such as print media type, image content type, physical dimension of the print media, weight of the print media, and print job data can be employed. Further, control of the image reproduction machine is generated in real time over a receding horizon, for the purpose of minimizing a cost function indicative of image variation, energy consumption, or the like.

20 Claims, 9 Drawing Sheets

PRINTING PROCESS MODEL PREDICTIVE CONTROL WITH DISTURBANCE PREVIEW

BACKGROUND

This disclosure relates in general to copier/printers, and more particularly, to printing systems for monitoring and controlling with a model predictive controller (MPC) and more specifically to tuning the MPC controller in the face of disturbance preview.

Modern printers and copiers employ many control systems to achieve higher performance through varying control logic schemes. Example control systems include media transport control, marking process control, fuser temperature control and the like. Various control logic schemes are known that implicitly affect a tradeoff of performance and print parameters. However, these tradeoffs are built-in and cannot be varied on the fly. Some systems have the ability to switch between a normal run mode and specific operating modes, but they are simply either "ON" or "OFF." The system cannot choose a varying level of functions or tailor specific functions for a specific component that is based on disturbances in the print process. To a printer or copier control system image content, media type, and other parameters are disturbances from the routine process. A disturbance preview is when the condition of the disturbance dynamics is known and available in advance.

A disturbance preview provides an opportunity for optimizing the print process by trading current performance for better overall performance. Before the impact of an impending disturbance, the state of the system may be driven out of the optimal region for current performance and enter a fast recovery region in preparation for the disturbance impact. However, conventional control systems in printing process do not take advantage of disturbance preview.

For the reasons stated above, and for other reasons stated below which will become apparent to those skilled in the art upon reading and understanding the present specification, there is a need in the art for anticipating the impact of a disturbance on a printer or copier and to control the printer or copier accordingly to mitigate the impact.

SUMMARY

The disclosure relates generally to methods and systems that incorporate a model predictive controller (MPC) in an image reproduction machine with known disturbance information. The MPC uses the control action at a current time in order to minimize the impact of an impending disturbance as well as to maximize current control performance. The impending disturbance is used by the MPC to determine an incremental change that combines steady state and transient state impact on the image reproduction machine. Disturbance such as print media type, image content type, physical dimension of the print media, weight of the print media, and print job data can be employed. Further, control of the image reproduction machine is generated in real time over a receding horizon, for the purpose of minimizing a cost function indicative of image variation, energy consumption, or the like.

DETAILED DESCRIPTION

Figure 1:
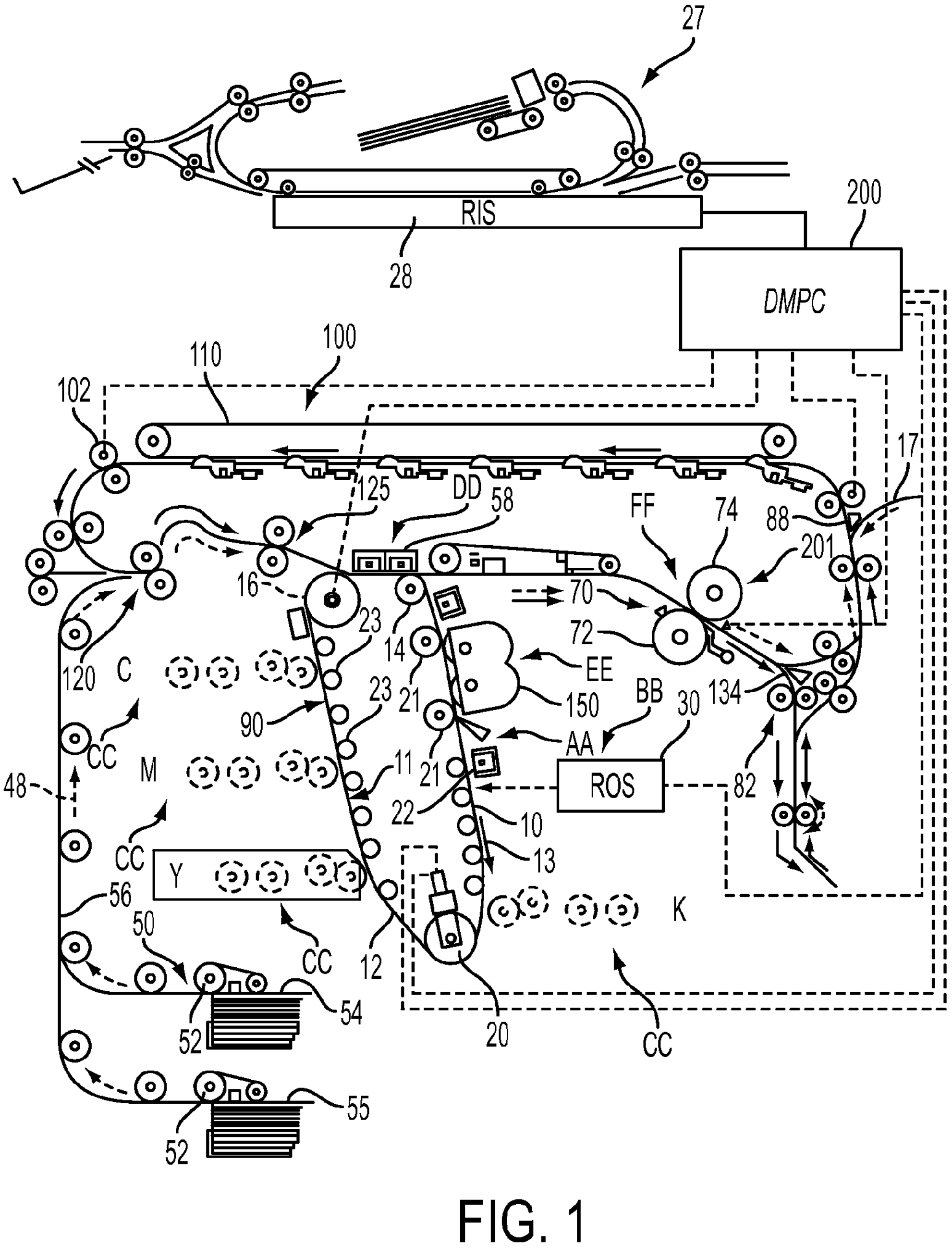
FIG. 1 is a schematic elevational view of an exemplary image reproduction machine including a fusing apparatus having a dynamic model predictive controller in accordance to an embodiment.

Aspects of the disclosed embodiments relate to an apparatus using dynamic model predictive control to mitigate the effects of known disturbance in the printing process to control an image reproduction machine such as a printer or a copier. In the implementation technique, the control action at current time step impact of an impending disturbance is minimized while current control performance is maximized. The dynamic model predictive control is demonstrated by applying the technique to a fuser temperature control.

The disclosed embodiments include an image reproduction machine with a moveable imaging member including an imaging surface; an imaging system to form and transfer an image from the imaging surface onto a print media; a fusing system to apply a fusing treatment to an image applied to the print media, wherein the fusing system includes a heated rotating fuser member and a rotating pressure member forming a fusing nip with said heated rotating fuser member; an interface to receive sensing data and to acquire at least one disturbance preview; and a dynamic model predictive controller to control the image reproduction machine based on the sensed data and the at least one disturbance preview. The dynamic model predictive controller determines an incremental change that combines steady state and transient state impact on the image reproduction machine. Further, control of the image reproduction machine is generated in real time over a receding horizon, for the purpose of minimizing a cost function. Examples of disturbance can be selected from print media type, image content type, coated print media, uncoated print media, physical dimension of the print media, weight of the print media, print job data.

The disclosed embodiments further include a method in a process control system having a dynamic model predictive controller to provide control to an image reproduction machine with a plurality of variables and at least one disturbance variable by performing the action of forming and transferring an image from an imaging surface onto a print media, wherein the print media is moveable by an imaging member that includes the imaging surface; applying a fusing treatment to the image applied to the print media, wherein the fusing treatment is applied by a fusing system that includes a heated rotating fuser member and a rotating pressure member forming a fusing nip with said heated rotating fuser member; receiving sensing data and acquiring at least one disturbance preview; and a dynamic model predictive controller to control the image reproduction machine based on the sensed data and the at least one disturbance preview. The sensing data is at least one of print media count data, temperature data, component state data, print media timing data, imaging data, electrical parameters.

In further disclosed embodiments, an apparatus to control an image reproduction machine with a plurality of variables and at least one disturbance variable. The apparatus comprises a memory that stores dynamic model predictive controlling instructions; and a processor that executes the dynamic model predictive controlling instructions to cause control of an image reproduction machine when receiving a print command by: forming and transferring an image from an imaging surface onto a print media, wherein the print media is moveable by an imaging member that includes the imaging surface; applying a fusing treatment to the image applied to the print media, wherein the fusing treatment is applied by a fusing system that includes a heated rotating fuser member and a rotating pressure member forming a fusing nip with the heated rotating fuser member; receiving sensing data and acquiring at least one disturbance preview; a dynamic model predictive controller to control the image reproduction machine based on the sensed data and the at least one disturbance preview; wherein the dynamic model predictive controller determines an incremental change that combines steady state and transient state impact on the image reproduction machine. The control of the image reproduction machine is generated in real time over a receding horizon, for the purpose of minimizing a cost function. The cost function can beat least one of gloss variation or color variation, image variation, power consumption, temperature variation, energy consumption.

Embodiments as disclosed herein may also include computer-readable media for carrying or having computer-executable instructions or data structures stored thereon for operating such devices as controllers, sensors, and eletromechanical devices. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

The term “image”, as used in this disclosure refers to a graphic or plurality of graphics, compilation of text, a contone or halftone pictorial image, or any combination or subcombination thereof, that is capable of being output on a display device, a marker and the like, including a digital representation of such image.

The term “print media” generally refers to a usually flexible, sometimes curled, physical sheet of paper, plastic, or other suitable physical print media substrate for images, whether precut or web fed.

The term “printing system” as used herein refers to a digital copier or printer, image printing machine, image reproduction machine, bookmaking machine, facsimile machine, multi-function machine, or the like and can include several marking engines, as well as other print media processing units, such as paper feeders, finishers, and the like.

FIG. 1 schematically illustrates an image reproduction machine 100 that generally employs a photoconductive belt 10 mounted on a belt support module 90. Preferably, the photoconductive belt 10 is made from a photoconductive material coated on a conductive grounding layer that, in turn, is coated on an anti-curl backing layer. Belt 10 moves in the direction of arrow 13 to advance successive portions sequentially through various processing stations disposed about the path of movement thereof. Belt 10 is entrained as a closed loop 11 about stripping roller 14, drive roller 16, idler roller 21, and backer rollers 23.

Initially, a portion of the photoconductive belt surface passes through charging station AA. At charging station AA, a corona-generating device indicated generally by the reference numeral 22 charges the photoconductive belt 10 to a relatively high, substantially uniform potential.

As also shown the image reproduction machine includes generally a dynamic model predictive controller (DMPC) 200 that is preferably a self-contained, dedicated minicomputer having a central processor unit (CPU), electronic storage, and a display or user interface (UI). The DMPC, with the help of sensors and connections, can read, capture, prepare, and process image data and machine status information.

At an exposure station BB, the controller or DMPC 200 receives the image signals from RIS 28 representing the desired output image and processes these signals to convert them to a continuous tone or gray scale rendition of the image that is transmitted to a modulated output generator, for example the raster output scanner (ROS), indicated generally by reference numeral 30. The image signals transmitted to DMPC 200 may originate from RIS 28 as described above or from a computer, thereby enabling the image reproduction machine to serve as a remotely located printer for one or more computers. Alternatively, the printer may serve as a dedicated printer for a high-speed computer. The signals from DMPC 200, corresponding to the continuous tone image desired to be reproduced by the reproduction machine, are transmitted to ROS 30.

ROS 30 includes a laser with rotating polygon mirror blocks. Preferably a nine-facet polygon is used. At exposure station BB, the ROS 30 illuminates the charged portion on the surface of photoconductive belt 10 at a resolution of about 300 or more pixels per inch. The ROS will expose the photoconductive belt 10 to record an electrostatic latent image thereon corresponding to the continuous tone image received from ESS 29. As an alternative, ROS 30 may employ a linear array of light emitting diodes (LEDs) arranged to illuminate the charged portion of photoconductive belt 10 on a raster-by-raster basis.

After the electrostatic latent image has been recorded on photoconductive surface 12, belt 10 advances the latent image through development stations CC, that include four developer units as shown, containing CMYK color toners, in the form of dry particles. At each developer unit the toner particles are appropriately attracted electrostatically to the latent image using commonly known techniques.

After the electrostatic latent image is developed, the toner powder image present on belt 10 advances to transfer station DD. A print media or print sheet 48 is advanced to the transfer station DD, by a sheet feeding apparatus 50. Sheet-feeding apparatus 50 may include a corrugated vacuum feeder (TCVF) assembly 52 for contacting the uppermost sheet of stack 54, 55. TCVF 52 acquires each top sheet 48 and advances it to vertical transport 56. Vertical transport 56 directs the advancing sheet 48 through feed rollers 120 into registration transport 125, then into image transfer station DD to receive an image from photoreceptor belt 10 in a timed. Transfer station DD typically includes a corona-generating device 58 that sprays ions onto the backside of sheet 48. This assists in attracting the toner powder image from photoconductive surface 12 to sheet 48. After transfer, sheet 48 continues to move in the direction of arrow 60 where it is picked up by a pre-fuser transport assembly and forwarded to fusing station FF.

Fusing station FF includes the uniform gloss fuser or fusing apparatus of the present disclosure that is indicated generally by the reference numeral 70 and shown as a roller/roller type fuser. As is well known, fusers can be roller/roller, that is, they comprise a fuser roller 72, forming a fusing nip 75 with a pressure member that is also a roller 74 as shown. They can also be roller/belt and comprise a fuser roller forming a fusing nip with a pressure member that is a belt (not shown). Furthermore, they can be belt/belt (not shown but well known) comprising a belt fuser member forming a fusing nip with a belt pressure member. In each case however, the fusing apparatus will be suitable for fusing and permanently affixing transferred toner images with a uniform gloss to copy sheets 48.

As further illustrated, after fusing, the sheet 48 then passes to a gate 88 that either allows the sheet to move directly via output 17 to a finisher or stacker, or deflects the sheet into the duplex path. Specifically, the sheet is first passed through a gate 134 into a single sheet inverter 82. That is, if the second sheet is either a simplex sheet, or a completed duplexed sheet having both side one and side two images formed thereon, the sheet will be conveyed via gate 88 directly to output 17. However, if the sheet is being duplexed and is then only printed with a side one image, the gate 88 will be positioned to deflect that sheet into the inverter 82 and into the duplex loop path, where that sheet will be inverted and then fed to acceleration nip 102 and belt transports 110, for recirculation back through transfer station DD and fuser 70 for receiving and permanently fixing the side two image to the backside of that duplex sheet, before it exits via exit path 17.

After the print sheet is separated from photoconductive surface 12 of belt 10, the residual toner/developer and paper fiber particles still on and may be adhering to photoconductive surface 12 are then removed there from by a cleaning apparatus 150 at cleaning station EE.

The image reproduction machine 100 can be any type of printer inclusive of ink jet printer such as a thermal ink jet, acoustic ink jet or piezoelectric ink jet printer. When using a piezoelectric ink jet printer, the temperature of the print head is preferably maintained at a suitable temperature range to achieve a jetting viscosity of the low viscosity curable ink. The print medium can be any medium that can be printed on, including clothing and plastic, but most preferably is paper. The required ink formulation comprises a monomer, a photoinitiator and a colorant. The low viscosity ink can also comprise an oligomer if the ink is cured by UV radiation. The dynamic model predictive controller is applicable to all printing arrangements that can be controllable.

Figure 2:
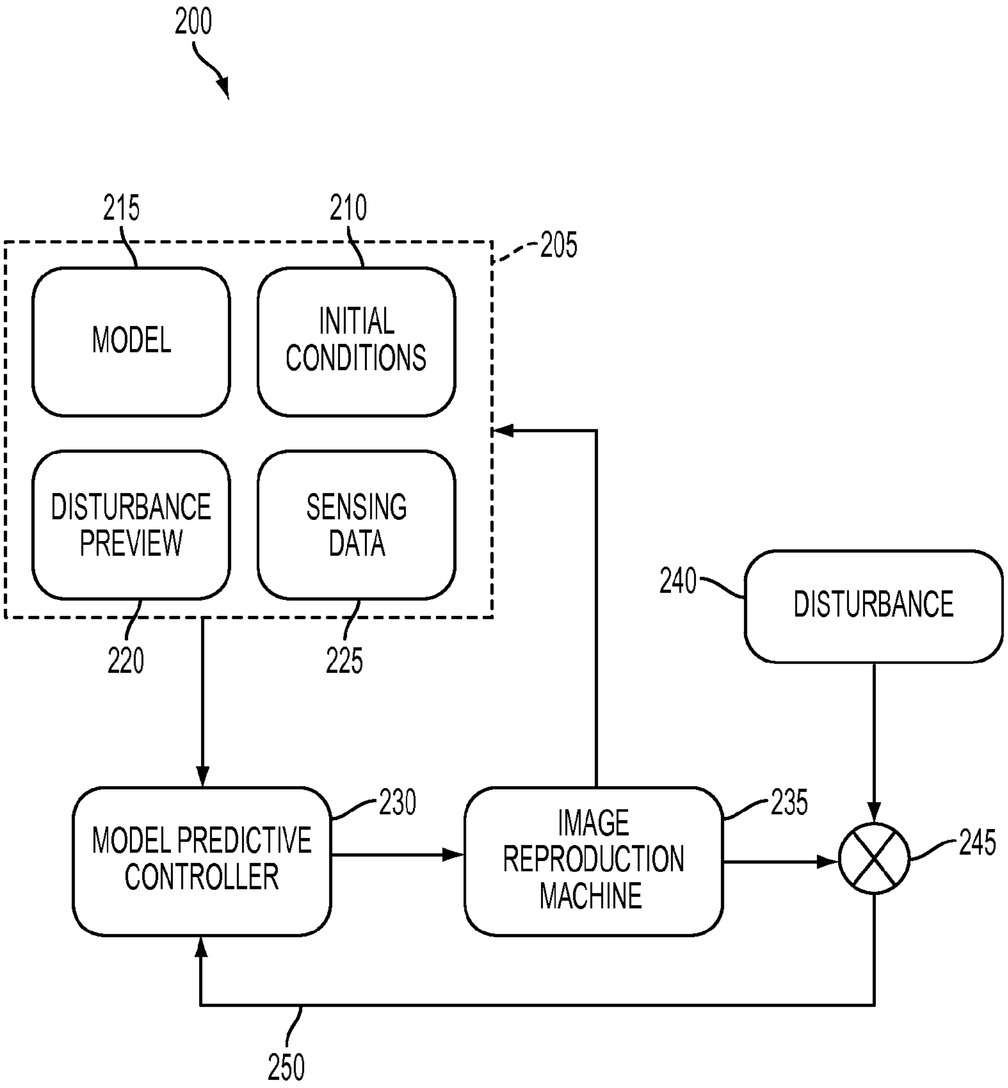
FIG. 2 is a block diagram of a dynamic model predictive controller of FIG. 1 in accordance to an embodiment.

FIG. 2 is a block diagram of a dynamic model predictive controller 200 of FIG. 1 in accordance to an embodiment. In particular, dynamic predictive controller 200 comprises a model predictive controller 230, an image reproduction machine 235 for turning heaters and other devices, combiner or mixer 245, a collection of data objects for performing data collection (210,220, 225) and maintaining a model (215) of the printing process. The model predictive controller 230 output are sent to the actuator arrays in image reproduction machine 235 and then the combined process output 245 and disturbance 240 detected by the system are fed back 250 to model predictive controller 230. Initial condition object 210 comprises maximum number of iterations, initial value for model parameters, spot color value for a copied image, and initializing values for the cost function. The sensing data object 225 collects values from the image reproduction machine 235,100. The values can comprise at least one of print media count data, temperature data, component state data, print media timing data, imaging data, and electrical parameters such as voltage or energy consumption. The disturbance preview object 220 represents information about a print job that the image reproduction machine needs to accommodate. The disturbance preview information includes print media type, image content type, coating on the print media, coated print media, physical dimension of the print media, weight of the print media, and print job data.

The model object 215 is characterized by a number of what is generally known as process output variables, process input variables and disturbance variables such as media type. The process relate to any form of operation in which the effects of changes in the input variables and the disturbance variables produce some changes in the output variables over a period of time. Typically, the changes in the output variables settle down to a constant value or near constant value including at a constant rate of change is generally known as steady state. A steady state represents final state of the process following the changes in the input variables and/or the disturbance variables. For a stable process, the steady state is achieved when the rate of change of its output variables becomes zero for inherently stable process or at the rate of change of its output attain a constant value for open-loop unstable process the steady state is achieved when the rate of change of its output variables attain a constant value. For the purpose of the disclosure of the present invention, both these types of process are considered to attain steady state in their respective manner. However, for sake of exposition, hereon only the inherently stable process will be considered without loss of generality.

Figure 4:
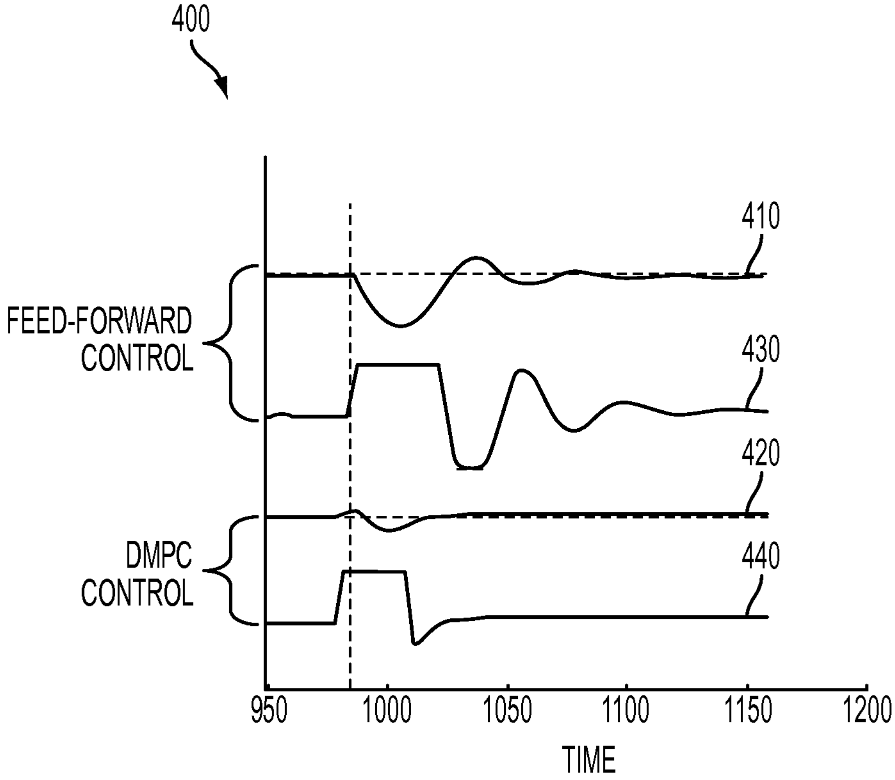
FIG. 4 is an illustration of start-of-job transient performance using dynamic model predictive control with disturbance preview in accordance to an embodiment.
Figure 5:
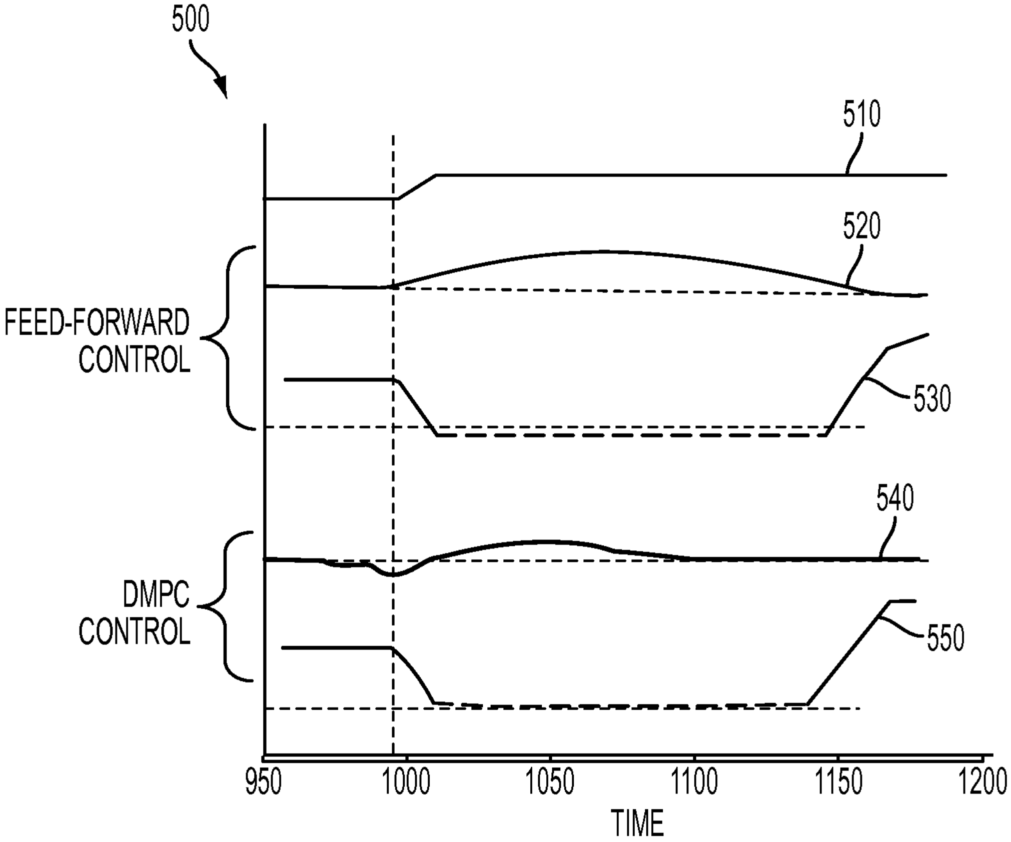
FIG. 5 is an illustration of end-of-job transient performance using dynamic model predictive control with disturbance preview in accordance to an embodiment.

The image reproduction machine 253 or 100 as shown in FIG. 1 is a dynamic system, and the output variables dynamic response is characterized by the following object model:

$$(C, Cdyn=G(Mdyn, Ddyn)$$

Where G( ) describes dynamic response of the output variables as (C, Cdyn) to a given set of dynamic moves in Mdyn and dynamic disturbance future (disturbance preview) in Ddyn. (C, Cdyn) consist of steady state response (C) and dynamic response (Cdyn). It should be noted that the dynamic response should converge to the steady state response. The object of the dynamic model predictive controller 200 is to optimize an objective function involving (C, Cdyn, M, Mdyn) subject to a set of constraints relating to the image reproduction machine 253, 100 dynamic characteristics. The dynamic optimization yields (M, Mdyn) the optimal solution. The model predictive controller 230 uses the model object 215 and current sensing data 225 to calculate future moves in the independent variables that will result in operation that honors all independent and dependent variable constraints. FIG. 4 shows how the model predictive controller response to a start-of-job condition and FIG. 5 shows the response for an end-of-job condition. The model predictive controller then sends this set of independent variable moves to the corresponding regulatory controller set points (actuators and switches) to be implemented by image reproduction machine 235.

When implemented the model predictive controller (MPC) 230 samples at time t the current image reproduction machine state and a cost minimizing control strategy is computed for a relatively short time horizon in the future (t,t+T). Before the impact of an impending disturbance, the state of the system (image reproduction machine) may be driven out of the optimal region for current performance and enter a fast recovery region in preparation for the disturbance impact. A gain matrix which is selected from a set of gain matrices within an iteration (i) that is calculated by minimizing a predetermined performance function comprising differences between calculated values to the sensed parameters for a preset planning or a predictive horizon. The gain matrix represents the actuator values for all the control variables being controlled in the image reproduction machine 100. The best gain matrix is selected out of the minimization procedure, which then becomes the gain matrix actively used during iteration. Each iteration (i) represents a step along the control horizon To evaluate the performance function of each iteration (i) the cumulative cost function is defined as:

$$J = \sum_{i=1}^{N} w_{x_i}(r_i - x_i)^2 + \sum_{i=1}^{N} w_{u_i}\Delta u_i^2$$

where xi is the i-th control variable such as measured fuser temperature; ri is the i-th reference variable such as required fuser temperature; ui is the i-th output variable (control value); wxi is the weighting coefficient reflecting the relative importance of xi; wui is the weighting coefficient penalizing relative big changes in ui. The xi or sensing data is at least one of print media count data, temperature data, component state data, print media timing data, imaging data, electrical parameters. The cost function is at least one of gloss variation or color variation, image variation, power consumption, temperature variation, energy consumption.

Figure 3:
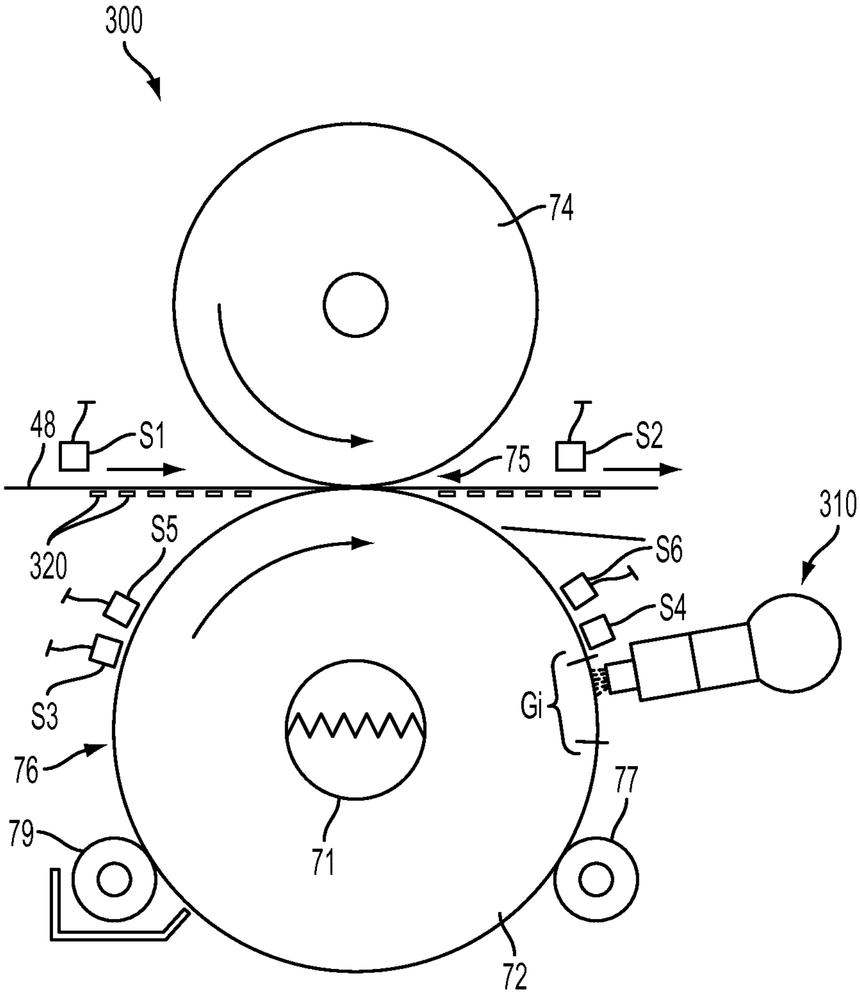
FIG. 3 is an enlarged end section schematic of the roller assembly of the fusing apparatus of FIG. 1 in accordance to an embodiment.

FIG. 3 is an enlarged end section schematic of roller assembly 300 of the fusing apparatus of FIG. 1 in accordance to an embodiment. The roller assembly includes sensors S1, S2 located along a path of travel of the copy sheet 48 into the fusing nip 75, and connected to dynamic model predictive controller (not shown) for sensing and timing an entrance of a copy sheet moving into contact with a surface 76, of a heated rotating fuser roller within the fusing nip, and an exit of the copy sheet from the fusing nip; sensors S3, S5 located on the upstream side of the fusing nip adjacent the surface 76, of the fuser roller and connected to DMPC 200 for sensing a temperature of a pre-fusing nip portion of the surface of the heated rotating fuser roller; sensors S4, S6 located on the downstream side of the fusing nip adjacent the surface 76 of the fuser roller 72 and connected to DMPC 200 for sensing a temperature of a post-fusing nip portion of the surface of the heated rotating fuser roller; and a control instructions (not shown) of DMPC 200 for determining a start and an end of an inter-sheet gap portion "Gi" on the surface of the heated rotating fuser roller during fusing operation of a series of copy sheets. The sensors S3 and S4 for example can be used to sense the temperatures of inter-sheet gap portions Gi before and after the fusing nip 75, and the sensors S5 and S6 can be used to similarly sense the temperatures of non-gap portions of the surface 76. Calculated differences between pairs of these sensed temperatures can be used by DMPC 200 to determine the need, rate, and intensity of application of the temperature so as to smooth out any temperature gradients, thus achieving assured uniform gloss. It should be noted that a gloss control apparatus 201 may include temperature conditioning devices, such as an on and off cooling device 310 for contacting the surface 76 of the heated rotating fuser roller 72 and programmable aspects including the control instructions of DMPC 200 for storing and supplying copy sheet type information and making control calculations using stored information and the sensed data from the sensors S1-S6, and further for controlling the on and off cooling device 210 to cool the inter-sheet gap portion Gi of the surface of the heated rotating fuser roller.

FIG. 4 is an illustration of start-of-job transient performance using dynamic model predictive control with disturbance preview 400 in accordance to an embodiment. FIG. 4 illustrates the strategy of using the conventional feed-forward control and dynamic model predictive control to the controlling of fuser temperature. In a typical fusing process, there are temperature transient caused by the sudden presence and absence of paper (disturbance), which corresponds to start-of-job droop and end-of-job overshoot. Existing control design deals with these disturbances at (feed forward) and/or after (feedback) they enter the fuser. In DMPC with disturbance preview, the controller uses paper information (paper-weight and process timing) from upstream process and prepares the fuser for the disturbances in advance. The start of job temperature droop 410 causes the conventional controller to drive or increase 420 the temperature so as to compensate. The conventional fuser temperature controller does not account for disturbances such as when a print media enters the fuser. The dynamic model predictive controller (DMPC) uses the disturbance, such as when a print media enters the fuser, to send a drive signal 440 to heat up the fuser above its set point. The action by the DMPC attenuates the droop 420 and overall performance is optimized for the image reproduction machine. As can be seen from the drive signal/temperature 430,410 there is wasted energy (heat) in the conventional controller since the heater is maintained "ON" even after the print media has exited the fuser area.

FIG. 5 is an illustration of end-of-job transient performance using dynamic model predictive control with disturbance preview in accordance to an embodiment. FIG. 5 illustrates conventional controller and DMPC controller reaction to a disturbance 510 that occurs when print media exits the fuser. The conventional controller reacts by driving 530 the temperature lower, a noticeable overshoot 520 develops at the beginning of the paper exit condition that smoothes out as the system slowly moves towards steady state. This overshoot leads to wasting of energy and lowers fuser system life since the system has to absorb the excessive heat. In contrast, the DMPC turns off fuser lamps 550 significantly before the last sheet. So that the end of job overshoot 540 is substantially reduced compared to existing approaches 520. The DMPC strategy lowers energy usage and prevents overheating from doing damaging the fuser system.

Figure 6:
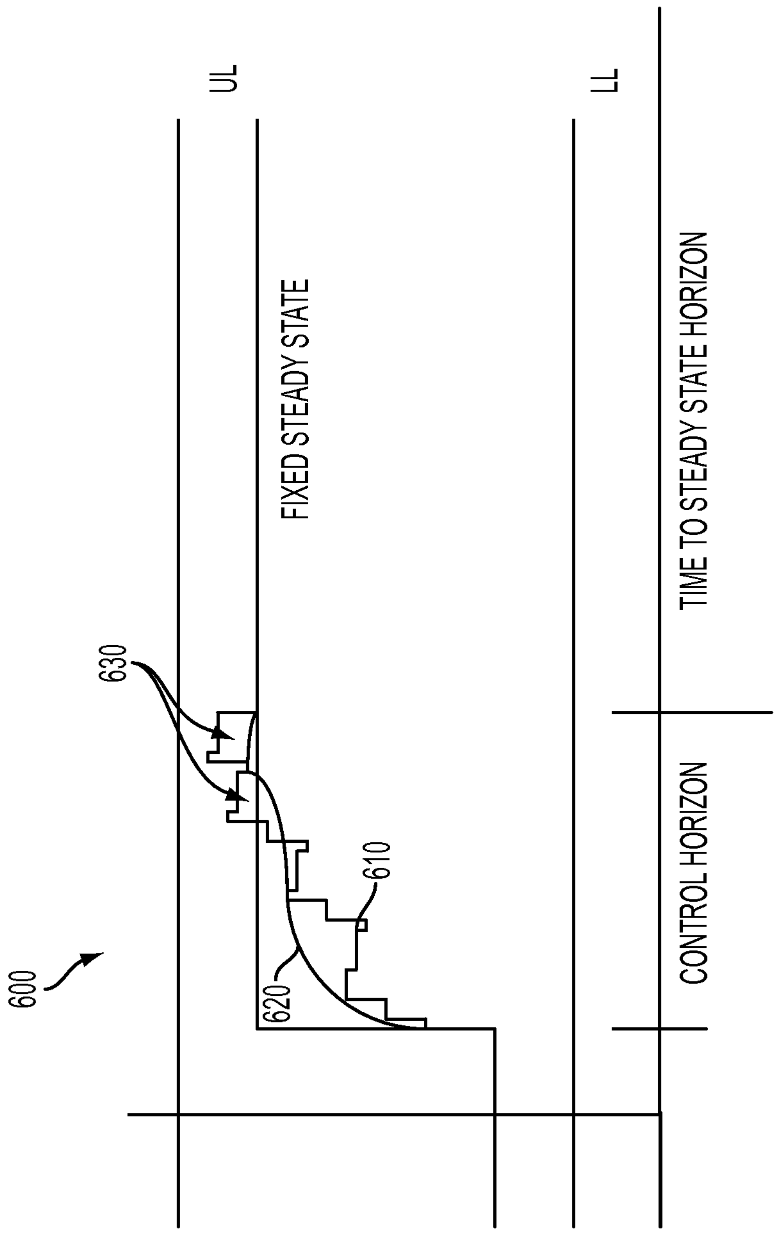
FIG. 6 is an illustration of variable manipulation during a control horizon in accordance to an embodiment.

FIG. 6 is an illustration of variable manipulation 600 during a control horizon in accordance to an embodiment. Low limit (LL) and upper limit (UL) constraints for the control moves 610, 620, 630 of the manipulated variables. The dynamic moves are positive dynamic moves 610 or negative dynamic moves so as to ensure that the dynamic moves lead the controlled variable to the optimal steady state value. The DMPC can utilize future move changes over the control horizon ΔU to determine the forced response (C, Cdyn). An action or move change ΔU(1) can then be determined and implemented at the image reproduction apparatus. A comparison of a previous action or move change implemented by the DMPC can be used to further improve the generation model and make the model more dynamic. Applying receding horizon control principles allows the model predictive controller to dynamically adjust to unexpected events that may occur over the control horizon. A receding horizon control strategy can be summarized as follows: (i) At time t and for the current state xt, solve an optimal control problem over a fixed future interval (t, t+T−1), taking into account the current and future constraints; (ii) apply only the first step in the resulting optimal control sequence; (iii) measure the state reached at time t+1; and (iv) repeat the fixed horizon optimization at time t+1 over the future interval (t+1; t+N), starting from the current state xi+1.

Figure 7:
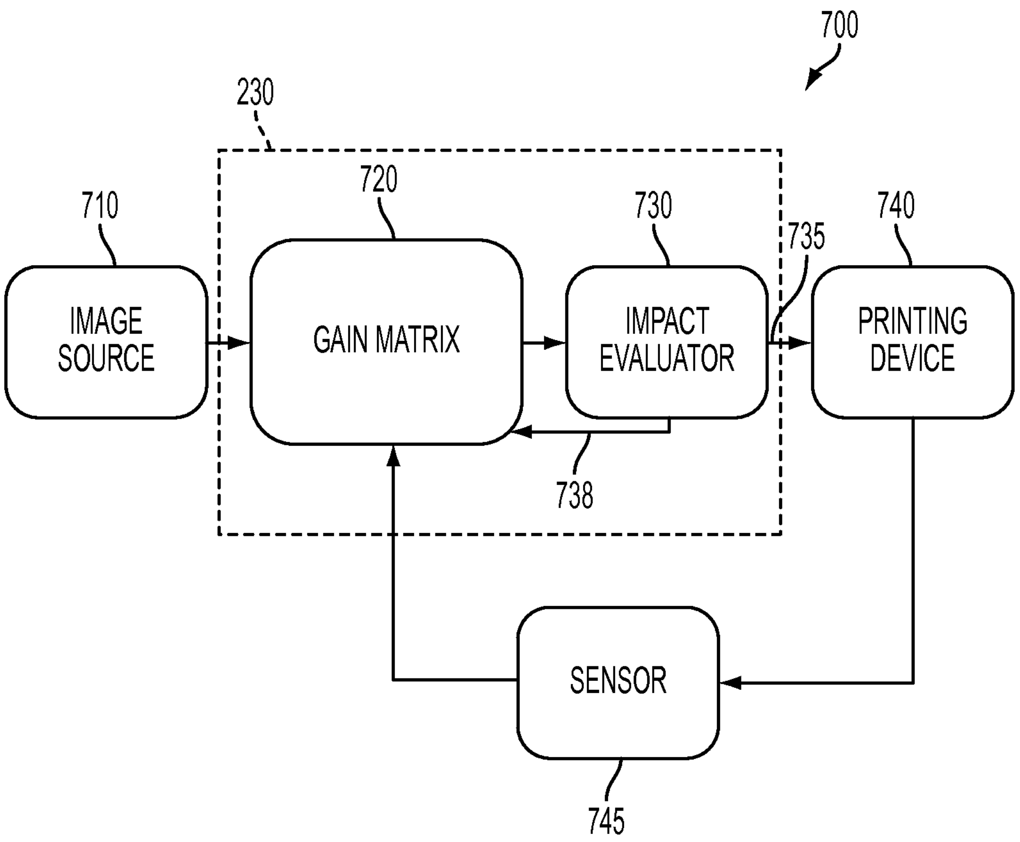
FIG. 7 illustrates the structure and functions performed by a dynamic model predictive controller of an image reproduction machine in accordance to an embodiment.

FIG. 7 illustrates the structure and functions performed by a dynamic model predictive controller 700, 200 of an image reproduction machine in accordance to an embodiment. It is to be understood that certain aspects of the system or DMPC 700, 200 would operate in accordance with pre-programmed instructions in a computer-readable media used to operate a local or networked computer system to carry out such features or perhaps on a plurality of interconnected computers at a time. Such a system might include a commercially available personal computer with computer-readable media and with appropriate graphics rendering capability that can also be associated with a networked storage medium or similar memory device wherein the system is accessible, perhaps via an Internet or intranet for submission of print jobs. It is also contemplated that one or more aspects of the system may be implemented on a dedicated computer workstation having a computer-readable media with appropriate instructions.

FIG. 7 shows that the MPC 230 is connected to an image data source 710, a printing device 740, and a sensor 746 for sensing data related to print media count data, temperature data, component state data, print media timing data, imaging data, electrical parameters. These devices are coupled together via data or communication links 735, 738. These links may be any type of link that permits the transmission of data, such as direct serial connections, a local area network (LAN), wide area network (WAN), wireless network, an intranet, the Internet, circuit wirings, and the like. The content for a printing job is initially provided by the customer through an image data source 710 in a form acceptable to the system.

The image data source 710 may be a personal computer, a microprocessor, a scanner, a disk drive, a tape drive, a hard disk, zip drive, CD-ROM drive, a DVD drive, a network server, a print server, a copying device, or any other known or later developed device or system that is able to provide the image data. Image data source 710 may include a plurality of components including displays, user interfaces, memory, disk drives, and the like. Printing device 740 may be any type of device that is capable of outputting a hard copy of an image and may take the form of a laser printer, a bubble jet printer, an ink jet printer, a copying machine, or any other known or later developed device or system that is able to generate an image on a recording medium using the image data or data generated from the image data.

The model predictive controller (MPC) 230 employs gain matrix module 720 and impact evaluator 730. The implementation of the MPC 230 selects a gain matrix which is selected from a set of gain matrices 720 within the iteration. The selection 738 is determined by impact evaluator 720, which minimizes a predetermined performance function comparing the determined values to the measured or sensed values 745 for a control horizon. The best gain matrix is selected out of the minimization procedure which then becomes the gain matrix actively used during iteration. A receding horizon is implemented whereby at each time increment (t,t+T) the horizon is displaced one increment towards the future. In addition, at each increment, the application of the first control signal, corresponding to the control action of the sequence calculated at that step, is made. Further, by adopting a receding horizon method, solutions are performed repeatedly to continually update both the optimal steady state targets and the dynamic moves.

Figure 8:
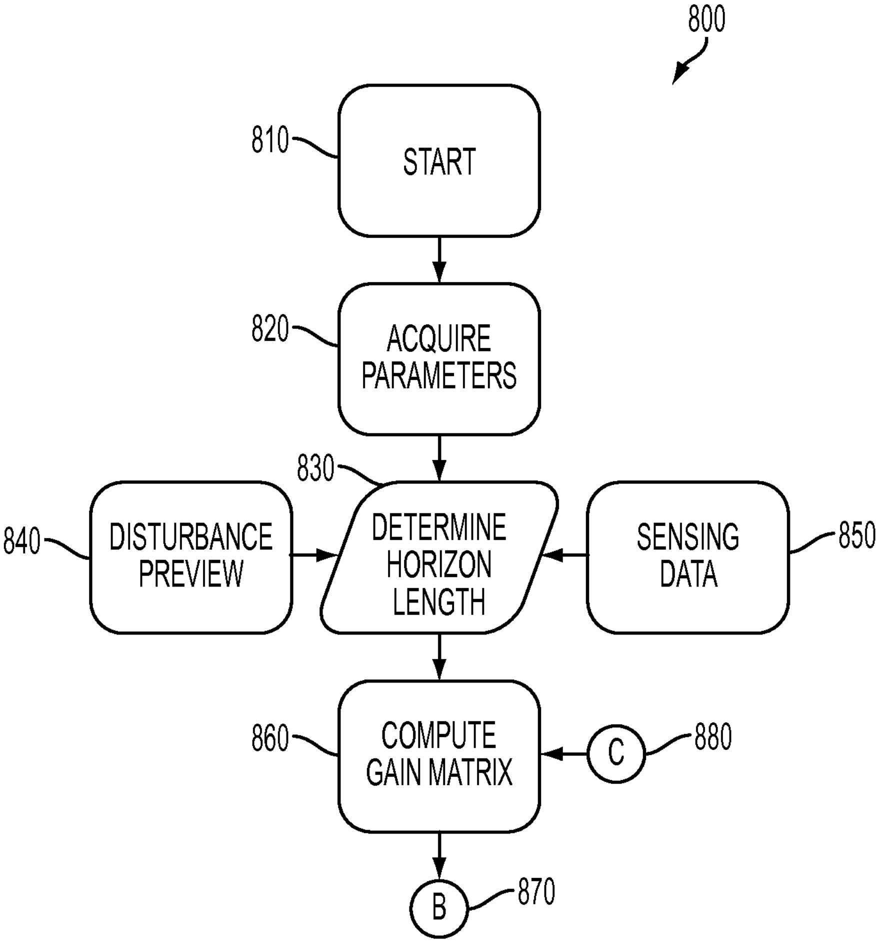
FIG. 8 is a flowchart of a method in a process control system having a dynamic model predictive controller to provide control to an image reproduction machine in accordance to an embodiment.

FIG. 8 is a flowchart of method 800 in a process control system having a dynamic model predictive controller to provide control to an image reproduction machine in accordance to an embodiment. In block 810, method 800 is started. The call may be encapsulated with values needed to initialize the DMPC algorithm, maximum number of iterations (imax), setting of all the parameters to be used during the implementation, and current iteration from other algorithms such as an Automated Spot Color Adjustment Editor (ASCE) algorithm when performing gloss variation or color variation. In block 820 the parameters or group of parameters, such as prediction horizon, control horizon and weights for an image reproduction machine can be downloaded or uploaded onto the controller. In block 840 disturbance preview data is acquired. In block 850 sensing data is acquired. In block 830, the acquired parameters 820, disturbance preview 840, and sensing data 850 are used to determine a horizon length. The horizon length relates to the maximum time to steady state considering all of the responses of the controlled variables for the changes in all of the manipulated variables plus the longest of the control horizon of all of the manipulated variables. The horizon length keeps being shifted forward (t+1) until the receding horizon reaches the total horizon length. In block 860, a gain matrix is computed. It should be noted that multiple gain matrices can be determined for a MIMO state-feedback controller design using known method available in the art. In block 880 updates to the gain matrix are received from other process or systems in the image reproduction machine. In block 870, control is passed to method 900 for further processing.

Figure 9:
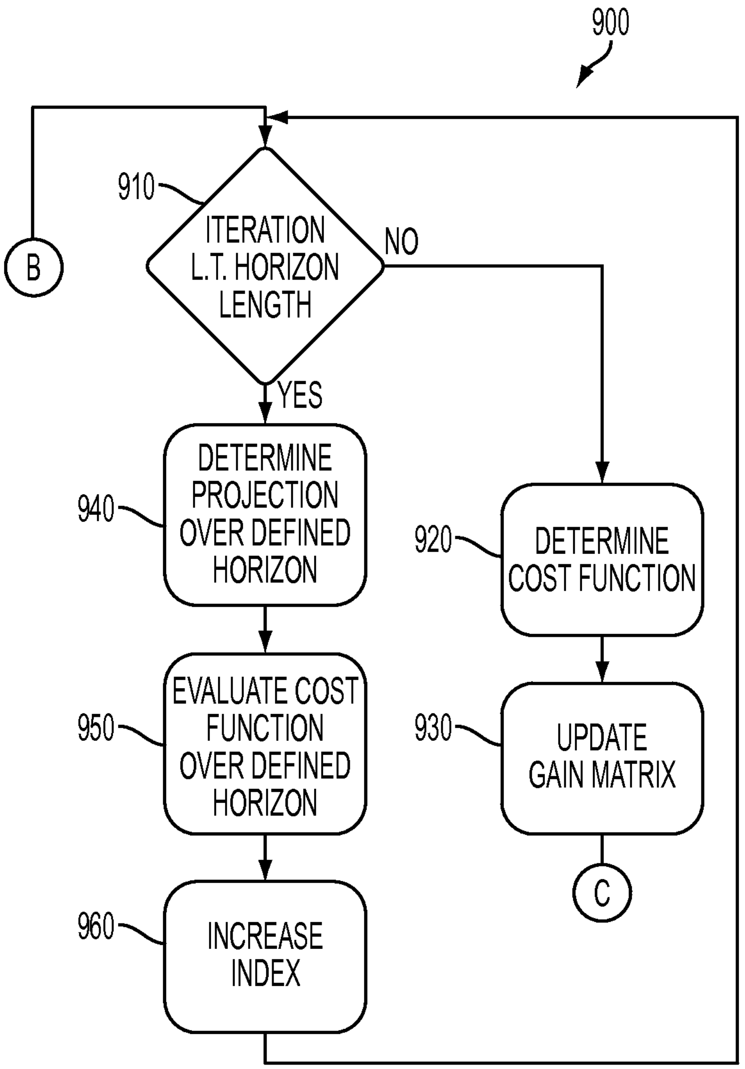
FIG. 9 is a flowchart outlining one exemplary embodiment of the operation of the dynamic model predictive controller over a defined horizon in accordance to an embodiment.

FIG. 9 is a flowchart outlining one exemplary embodiment of the operation of the dynamic model predictive controller over a defined horizon in accordance to an embodiment. In block 910 a decision is made to determine if an index, i.e. (t+1), is less than the horizon length. The index represents the time increment for solving optimal control problem progressing towards the horizon length. If the index is less than the horizon length control passes to block 940. In block 940 a projection is determined over the defined horizon. In action 950, the cost function is calculated over the defined horizon. In block 960, the index is incremented by a desired amount (1, 2 . . . N). The actions are repeated until the index is greater than or equal to the horizon length. When the condition is not met at block 910 control passes to block 920. In block 920 the cost function is determined. The cost function determined in block 920 is identical to the cost function determined in block 950 and could be passed by block 950. In block 930, the gain matrix is updated and forwarded to method 800 at node C to be used by block 860.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. An image reproduction machine comprising:

a moveable imaging member including an imaging surface;

an imaging system to form and transfer an image from the imaging surface onto a print media;

a fusing system to apply a fusing treatment to an image applied to the print media, wherein the fusing system includes a heated rotating fuser member and a rotating pressure member forming a fusing nip with said heated rotating fuser member;

an interface to receive sensing data and to acquire at least one disturbance preview; and a dynamic model predictive controller to control the image reproduction machine based on the sensed data and the at least one disturbance preview;

wherein the dynamic model predictive controller determines an incremental change that combines steady state and transient state impact on the image reproduction machine;

wherein said control of the image reproduction machine is generated in real time over a receding horizon, for the purpose of minimizing a cost function.

2. The image reproduction machine of claim 1, wherein disturbance preview is one of print media type, image content type, coated print media, uncoated print media, physical dimension of the print media, weight of the print media, print job data.

3. The image reproduction machine of claim 1, wherein the sensing data is at least one of print media count data, temperature data, component state data, print media timing data, imaging data, electrical parameters.

4. The image reproduction machine of claim 3, wherein print media timing data comprises at least one of sensing print media movement on the moveable imaging member, sensing print media entry into the fusing system, sensing print media exit from the fusing system, timing print media exit from the fusing system.

5. The image reproduction machine of claim 2, wherein the cost function is at least one of gloss variation or color variation, image variation, power consumption, temperature variation, energy consumption.

6. The image reproduction machine of claim 2, wherein the dynamic model predictive controller employs an objective function to determine an incremental change that minimizes an impact on the image reproduction machine at steady and transient states.

7. The image reproduction machine of claim 6, wherein the dynamic model predictive controller performs at successive time interval sensing data and feedback of process responses resulting from the incremental change applied at previous time intervals.

8. A method in a process control system having a dynamic model predictive controller to provide control to an image reproduction machine with a plurality of variables and at least one disturbance variable, the method comprising:

forming and transferring an image from an imaging surface onto a print media, wherein the print media is moveable by an imaging member that includes the imaging surface;

applying a fusing treatment to the image applied to the print media, wherein the fusing treatment is applied by a fusing system that includes a heated rotating fuser member and a rotating pressure member forming a fusing nip with said heated rotating fuser member;

receiving sensing data and acquiring at least one disturbance preview; and a dynamic model predictive controller to control the image reproduction machine based on the sensed data and the at least one disturbance preview;

wherein the dynamic model predictive controller determines an incremental change that combines steady state and transient state impact on the image reproduction machine;

wherein said control of the image reproduction machine is generated in real time over a receding horizon, for the purpose of minimizing a cost function.

9. The method of claim 8, wherein disturbance preview is one of print media type, image content type, coated print media, uncoated print media, physical dimension of the print media, weight of the print media, print job data.

10. The method of claim 8, wherein the sensing data is at least one of print media count data, temperature data, component state data, print media timing data, imaging data, electrical parameters.

11. The method of claim 10, wherein print media timing data comprises at least one of sensing print media movement on the moveable imaging member, sensing print media entry into the fusing system, sensing print media exit from the fusing system, timing print media exit from the fusing system.

12. The method of claim 9, wherein the cost function is at least one of gloss variation or color variation, image variation, power consumption, temperature variation, energy consumption.

13. The method of claim 9, wherein the dynamic model predictive controller employs an objective function to determine an incremental change that minimizes an impact on the method at steady and transient states.

14. The method of claim 13, wherein the dynamic model predictive controller performs at successive time interval sensing data and feedback of process responses resulting from the incremental change applied at previous time intervals.

15. An apparatus to control an image reproduction machine with a plurality of variables and at least one disturbance variable, comprising:

a memory that stores dynamic model predictive controlling instructions; and a processor that executes the dynamic model predictive controlling instructions to cause control of an image reproduction machine when receiving a print command by:

forming and transferring an image from an imaging surface onto a print media, wherein the print media is moveable by an imaging member that includes the imaging surface;

applying a fusing treatment to the image applied to the print media, wherein the fusing treatment is applied by a fusing system that includes a heated rotating fuser member and a rotating pressure member forming a fusing nip with said heated rotating fuser member;

receiving sensing data and acquiring at least one disturbance preview;

a dynamic model predictive controller to control the image reproduction machine based on the sensed data and the at least one disturbance preview;

wherein the dynamic model predictive controller determines an incremental change that combines steady state and transient state impact on the image reproduction machine;

wherein said control of the image reproduction machine is generated in real time over a receding horizon, for the purpose of minimizing a cost function.

16. The apparatus of claim 15, wherein disturbance preview is one of print media type, image content type, coated print media, uncoated print media, physical dimension of the print media, weight of the print media, print job data.

17. The apparatus of claim 15, wherein the sensing data is at least one of print media count data, temperature data, component state data, print media timing data, imaging data, electrical parameters.

18. The apparatus of claim 16, wherein print media timing data comprises at least one of sensing print media movement on the moveable imaging member, sensing print media entry into the fusing system, sensing print media exit from the fusing system, timing print media exit from the fusing system.

19. The apparatus of claim 16, wherein the cost function is at least one of gloss variation or color variation, image variation, power consumption, temperature variation, energy consumption.

20. The apparatus of claim 16, wherein the dynamic model predictive controller employs an objective function to determine an incremental change that minimizes an impact on the apparatus at steady and transient states; and wherein the dynamic model predictive controller performs at successive time interval sensing data and feedback of process responses resulting from the incremental change applied at previous time intervals.

* * * * *